United States Patent [19]
Nann et al.

[11] Patent Number: 4,760,001
[45] Date of Patent: Jul. 26, 1988

[54] NEGATIVE ELECTRODE FOR LEAD ACCUMULATORS

[75] Inventors: Eberhard Nann, Soest-Deiringsen; Wieland Rusch, Soest, both of Fed. Rep. of Germany

[73] Assignee: Hagen Batterie AG, Soest, Fed. Rep. of Germany

[21] Appl. No.: 26,610

[22] Filed: Mar. 17, 1987

[30] Foreign Application Priority Data

Apr. 2, 1986 [DE] Fed. Rep. of Germany ....... 3610951

[51] Int. Cl.$^4$ .................. H01M 2/18; H01M 4/74
[52] U.S. Cl. .................. 429/136; 429/179; 429/211; 429/238; 429/242
[58] Field of Search ............. 429/136, 211, 238, 241, 429/242, 178, 179

[56] References Cited

U.S. PATENT DOCUMENTS 4,535,040  8/1985  Kline ................................. 429/234
4,554,228  11/1985  Kiessling ........................... 429/242

FOREIGN PATENT DOCUMENTS 57-90874   6/1982  Japan ................................ 429/242
59-224053  12/1984  Japan ............................... 429/242
WO82-01277  4/1982  World Int. Prop. O. .......... 429/242

Primary Examiner—Aaron Weisstuch
Attorney, Agent, or Firm—Townsend & Townsend

[57] ABSTRACT

A negative electrode for lead accumulators has the shape of a rectangular planar grid plate (11) consisting of expanded copper metal which serves as a carrier for the active mass and for the supply and extraction of current. The grid plate (11) consists of two side regions of expanded copper metal (14) and a copper strip (12) which is arranged between them in one piece therewith, and which projects at one end beyond the regions of expanded copper metal in order to form the connection lug (13). A current conducting strip is formed at the upper edge of the regions (14) of the expanded metal grid by the appropriately cut-off webs (15) which are bent towards one another into mutual contact at the edge (16) of the expanded copper metal regions (14) at the connection lug side.

16 Claims, 4 Drawing Sheets

NEGATIVE ELECTRODE FOR LEAD ACCUMULATORS

The invention relates to a negative electrode for lead accumulators in the form of a rectangular, planar grid plate of expanded copper metal which is coated with a layer of lead and serves as a carrier for the active mass and for the supply and extraction of current, wherein the stretching direction of the expanded metal extends parallel to that side of the rectangular plate at which the connection terminal is arranged, and wherein a metallic current conducting strip is provided at the relevant side, extends over the full length thereof, and is connected to the connection terminal.

In a known negative electrode of this kind (German Pat. No. 22 41 368) the current conducting strip is formed by a lead strip secured to the upper edge of the grid plate. The connection terminal or lug is formed in one piece with the lead strip. Furthermore, it is already known (U.S. Pat. No. 4,554,228) to cast the lead strip onto the grid plate in order to achieve a good current conducting connection between the expanded copper metal and the lead strip.

Even though the conduction of current is considerably improved in the known negative electrode by the use of the expanded copper metal, the problem still exists of leading the current generated in the individual surface regions of the grid plate to the connection lug with as few losses as possible. The attachment of the lead strip to the upper edge of the grid plate leads to high manufacturing complexity and expense and moreover increases the relatively low weight of the grid plate achieved by the use of copper.

The principal object underlying the invention is thus to provide a negative electrode of the initially named kind which, with simplified manufacture and reduced weight, ensures current conduction to the connection lug which is as loss free as possible.

In order to satisfy this object the invention provides that the grid plate consists of two side regions of expanded copper metal and a flat copper strip unitarily arranged therebetween which projects beyond the regions of expanded copper metal at one side to form the connection lug; and in that the current conducting strip is formed by the webs at the edge of the regions of expanded copper metal located at the connection lug side of the copper grid plate, said webs being appropriately cut off and bent towards one another into mutual contact.

By providing the copper strip between the regions of expanded copper metal the current extraction from the individual surface regions of the expanded copper metal is substantially improved because the current is first led in the transverse direction to the copper strip which is relatively close, from which the current can then pass almost without loss to the connection lug, because with a suitable choice of the width of the copper strip the latter has a substantially lower resistance then the expanded copper metal. This advantage is particularly notable with traction or propulsion batteries where the individual grid plates are relatively very tall in comparison to their width.

As a result of the electrically conductive interconnection of the webs which are cut-off at their upper edges the mounting of a lead strip in this region is completely unnecessary. This signifies not only a considerably simplification of the manufacturing process and a saving in weight, but it is also of especial advantage that a particularly low loss current path is provided in the transverse direction towards the copper strip, or the connection lug, by the electrically conductive connection of the cut-off webs, because the bent over webs which are brought into connection consist of copper. Thus improved current guidance is ensured in the particularly critical region of the upper edge of the grid plate, and indeed surprisingly with weight reduction and notwithstanding simplified manufacture. The current conducting strip formed by the cut-off webs which are bent towards one another simultaneously has the advantage of being the termination of the plate composition (mass field).

Although it is preferred for the copper strip to be located approximately at the center between the two regions of expanded copper metal, for reasons of current conduction to the copper strip which is as loss-free as possible, it is nevertheless possible for the copper strip to be eccentrically arranged relative to the center of the grid plates, however relatively close to the center. In this way the connection lugs can be connected to the connectors which electrically connect together the negative plates while being clearly separated from the connection lugs of the positive plates arranged between the negative plates.

It is particularly expedient when the webs are so cut-away at the upper edge between two node points that their length is substantially equal to half the length of the diagonal of the expanded metal mesh extending parallel to the upper edge. As a result of this construction the webs which have been cut to length must be bent downwardly practically into alignment with the direction of the upper edge, so that a current conducting strip extending substantially perpendicular to the copper strips is in practice located at the upper edge of this grid plate. The thought underlying the invention is thus that the current conducting strip which is to be provided at the upper end of the grid plate is formed by the bent over webs of the expanded copper metal itself. This thought could fundamentally also be used for all expanded metal copper grid plates in which either no copper strip at all is provided or in which a copper strip is provided at one end. Preferably, and with particular advantage however, the webs of the expanded copper metal which are bent over into a current conducting strip are used with the approximately centrally arranged copper strip which merges in one piece into the connection lug.

A further advantageous embodiment is characterised in that the contacting connection of the contacting bent over webs is supplemented additionally by a solder connection as a result of subsequent tinning and/or leading. Such expanded metal copper grids are usually first tinned and then coated with a layer of lead. This measure is used in accordance with the invention after the webs have been bent over and brought into contact at the edge of the grid plate facing the connection lug, so that the mechanical connection is supplemented by a soldered connection.

In order to accommodate and retain negative composition also in the region of the copper strip a further embodiment is constructed wherein the copper strip has holes distributed over its length with the region directly below the connection terminal or the upper edge being kept free of holes. The freeing of the copper strip of bores in the region of the transition from the edge of the expanded metal to the connection lug is of particular significance, since in this critical region the conduction of current may not be hindered by the introduction of additional resistances. In order to introduce and to reliably hold as much active mass as possible in the holes each hole should be surrounded by a collar which is formed of the copper material pressed out by punching from the region of the holes. In this connection it is expedient when the collars are alternately located on the one and on the other side of the copper strip.

When the grid plates are arranged as usual with vertically extending copper strips and upwardly disposed connection lugs in a housing the current which flows from the lower regions of the plate upwardly to the connection terminal will, on the whole, always experience a higher resistance than the current rising in the higher regions of the grid plate. In order to bring about improved current conduction also in this respect a further embodiment of the invention is characterized in that the copper strip projects beyond the regions of expanded copper metal at both ends of the grid plate in order to form two connection lugs. The connection lugs at both ends of the grid plate are connected to a common connection terminal via suitable connectors.

Since it is problematic to connect the connection lugs at the lower end of the grid plate to the top via connectors a further embodiment of the invention is characterized in that the grid plates are horizontally arranged in a housing alternately with separator material and positive plates, which likewise have connection terminals at both ends, with a gel-like or fleece or fiber-bound electrolyte being used. In this way the connection terminals provided at opposite sides can be led symmetrically into the upper region of the housing via suitable connectors.

In order to retain the electrolyte in a fleece the positive electrode plates are preferably laid into pockets formed in a glass fiber mat as described in detail in the simultaneously filed patent application U.S. Ser. No. 026,581 filed on Mar. 17, 1987 by Ulrich Romling et al. The title of the invention is "Method of manufacturing accumulators with accumulator plate sets and accumulators manufactured in accordance with this method." In this manner practically the entire electrolyte is located within the accumulator housing in bound form within the glass fleece. The use of expanded copper metal as the negative electrode plate in this case offers the particular advantage that good thermal dissipation to the poles is ensured via the copper. This is particularly important when using gel-like or fleece-bound electrolytes because here the possibility of dissipation by electrolyte convection is not available.

One embodiment having horizontally arranged plates is also of significance without the feature of the specially constructed current conducting strip.

A further possibility lies in arranging the grid plates in a housing alternatingly with separator material and positive plates, which likewise have connection lugs at both ends, with the grid plates being arranged vertically and with the copper strips extending horizontally. In this case a liquid electrolyte can also be used because of the vertical arrangement of the grid plates.

In accordance with a further embodiment a plastic termination strip can be mounted by injection moulding or extrusion at the foot of the grid plate.

It is however preferred for a current conducting strip to be arranged at the lower edge of the grid plate and to be constructed in the same way as the current conducting strip at the top. In this way the conductivity in the transverse direction is also increased at the lower edge of the grid plate.

In a lead accumulator with negative electrodes in accordance with the present invention it is expedient for the positive plates which are preferably pocketed in glass fiber mat separator leaves to be manufactured as gravity cast grids or as tubular plates.

In this arrangement provision should in particular be made for the cores of the tubules filled with the positive mass to project significantly beyond the foot strips and for them to be soldered or welded there to the current conducting strip having the connection lug or for the foot strip to directly form the current conducting strip.

The invention will now be described in the following by way of example and with reference to the drawings in which.

Figure 1:
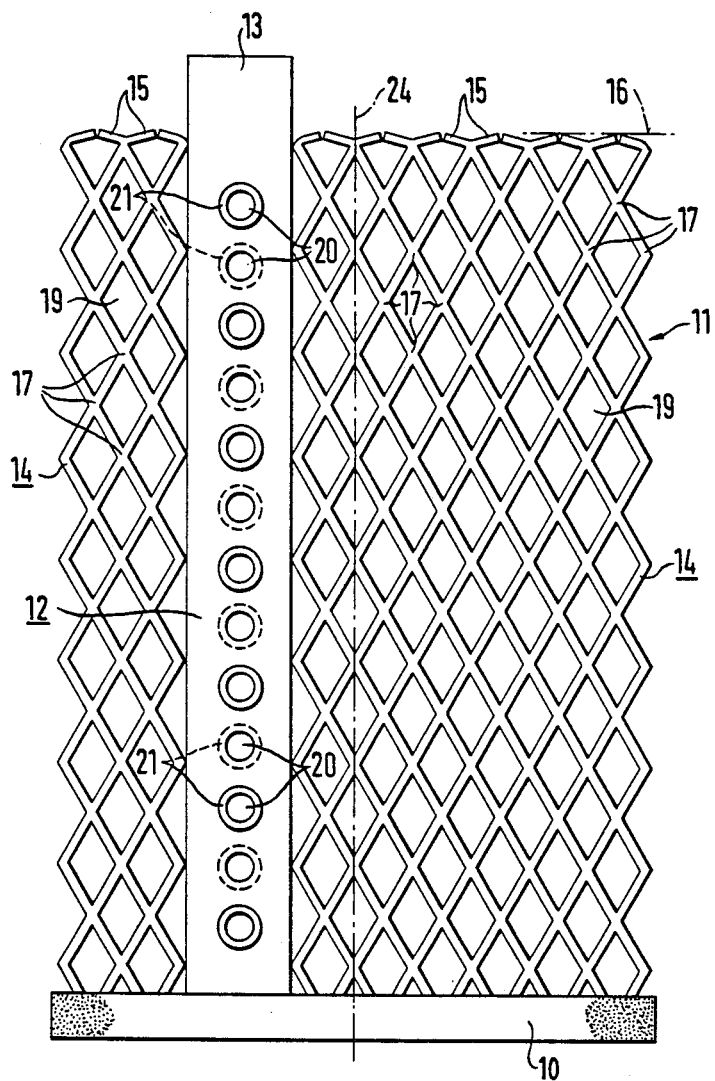
FIG. 1 is a schematic plan view of a negative electrode in accordance with the invention.
Figure 2:
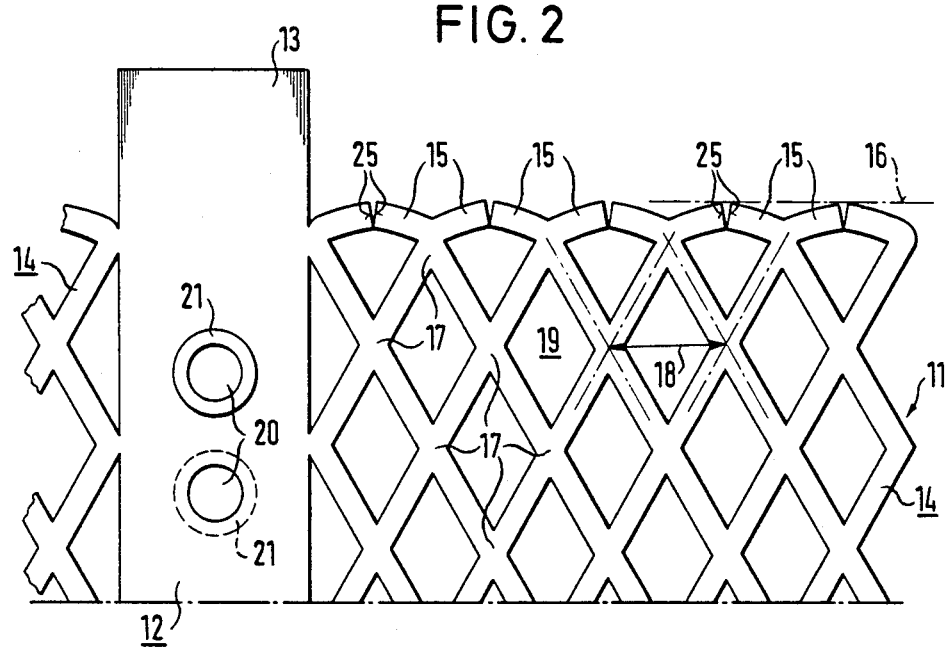
FIG. 2 is an enlarged section of FIG. 1 in the region of the transition from the regions of expanded copper metal into the connection lug and into the copper strip.

As seen in FIGS. 1 and 2 a grid plate 11 in accordance with the invention has a vertically extending flat copper strip 12 which is displaced somewhat to one side relative to the vertical central axis 24 of the grid plate 11. Regions 14 of expanded copper metal in one piece with the copper strip 12 extend from the copper strip 12 to both sides thereof. At the top the copper strip 12 merges in one piece into a connection lug 13 which projects beyond the upper edge 16 of the regions 14 of expanded copper metal.

As can be seen particularly clearly from FIG. 2 the regions of expanded copper metal 14 are cut-off horizontally from the expanded copper material lying above them at the region of the upper edge 16 in such a way that the remaining webs 15, which are only connected further down at the intersection at nodal points 17, have a length which substantially corresponds to half the length of a horizontal diagonal 18 of the expanded metal mesh 19. The webs 15 are bent towards one another pairwise in a direction which extends perpendicular to the longitudinal extent of the copper strip 12. In this way the cut-off ends 25 of respective pairs of webs 15 which lie alongside one another after being cut-off are brought into mechanical and current conducting connection. By suitable execution of the cut and pressing together a contact region should exist between the bent over webs 15 with as large an area as possible. During subsequent tinning and leading the gaps which may eventually still remain in the contact regions are filled with tin and lead so that the mechanical connection is supplemented by a soldered connection.

Bores 20 are provided in the copper strip 12 substantially below the lower edge 16 of the grid plates 11. The bores have a uniform spacing and only have a size such that the current conduction of the copper strip 12 is not notably impaired. As seen in FIG. 1, thirteen bores are uniformly distributed at constant intervals over approximately the entire height of the copper strip 12.

Figure 3:
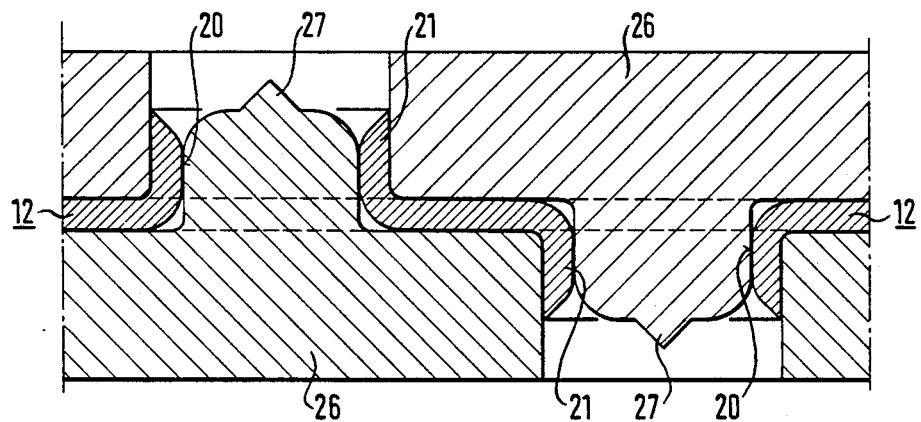
FIG. 3 is a schematic enlarged sectional representation of a portion of the copper strip of the negative electrode of the invention during the formation of the composition retaining and receiving bores.

FIG. 3 shows the punching-drawing tool 26 by means of which the bores 20 are formed in the copper strips 12. The tool has a male die provided with points 27 which on being moved downwardly onto the copper strip 12 result in the sheet copper material being first penetrated at the center of the bores 20 which are to be provided and then being bent outwardly through 90° in such a way that cylindrical collars 21 are created which project alternately towards opposite sides of the copper strip 12. The bores 20 and in particular the collars 21 serve to accommodate and to firmly retain the active mass of the negative electrodes.

Figure 4:
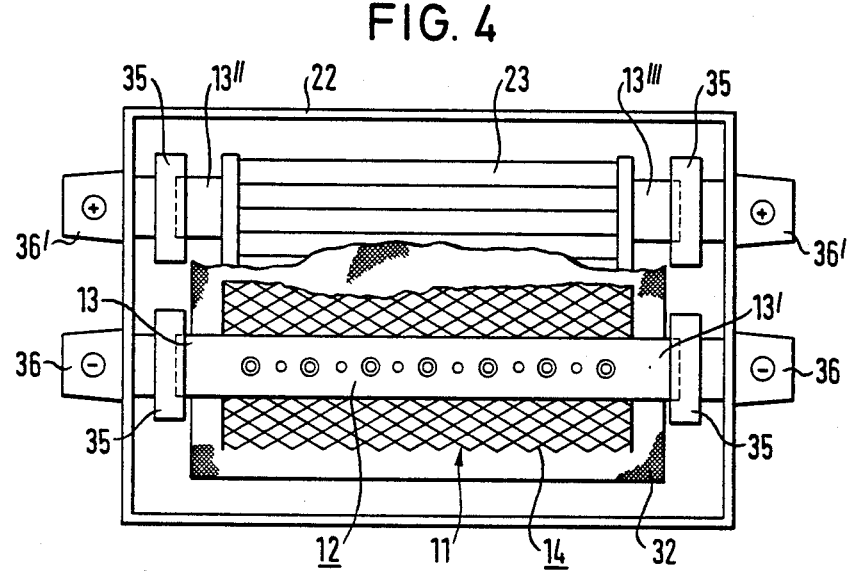
FIG. 4 is a plan view of an accumulator housing equipped with horizontally arranged negative electrodes in accordance with the invention.

In the embodiment of FIG. 4 the negative electrodes 11 alternate with positive plates 23 with separator material 32 disposed therebetween and are horizontally arranged in a housing 22 which contains a gel-like or fleece-bound electrolyte. The negative plates 11 and the positive plates 23 have respective connection lugs 13, 13′ and 13″, 13‴ at their oppositely disposed end faces. The connection lugs 13, 13′ of the negative electrodes 11 are formed by the copper strip 12 being extended at both end faces beyond the regions 14 of expanded copper metal. The connection lugs 13, 13′ and 13″, 13‴ respectively are electrically conductingly connected in a manner not shown to connectors which lead to the connection terminals (poles) of the housing.

The connection lugs 13, 13′ and 13″, 13‴ are electrically conductively connected together by bridges 35 extending within the housing 22 with the bridges being arranged above one another at the two sides of the housing and extending horizontally. The poles 36, 36′ which are led out of the sides of the housing are connected to the bridges 35. The connection lugs could naturally also be connected together outside of the housing. The positive plates 23 are manufactured as tubular plates or grid plates, for example expanded metal grids of lead.

The positive electrodes 23 are preferably inserted into pockets of a microporous glass fiber mat separator 32 whereby the electrolyte is bound. The use of a gel-like electrolyte is also possible.

The use of a negative electrode of expanded copper metal has, in connection with the fixing of the electrolyte in a glass mat separator 32, or through a similar characteristic, the particular advantage that the heat from the interior of the accumulator is dissipated towards the poles 36, 36′ in a substantially better manner. This is important in this embodiment because electrolyte convection which could otherwise make heat exchange possible, cannot take place.

Figures 6, 7, 8:
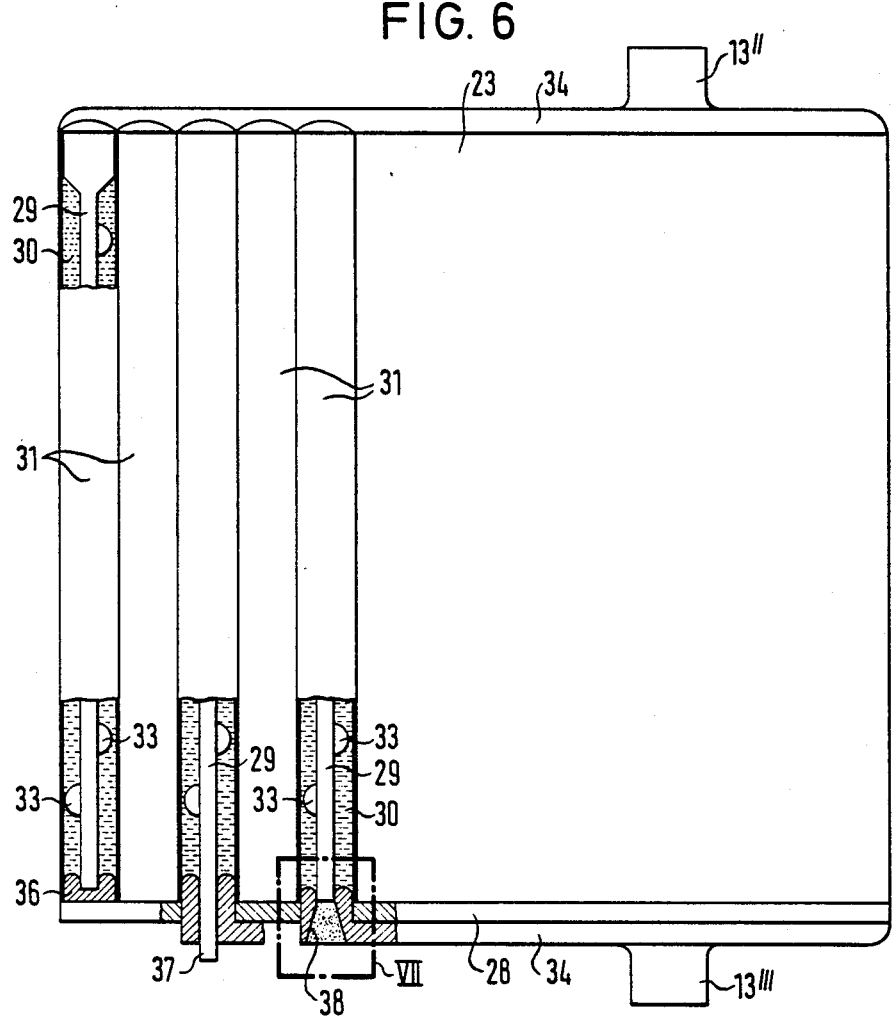
FIG. 6 is a positive tubular plate particularly suited for the lead accumulator of FIG. 4.
FIG. 7 is the portion VII of FIG. 6 which has been rotated through 180°, shown to an enlarged scale during the welding of the core with the current conducting strip.
FIG. 8 is a partial representation of the lower part of a tubule of a tubular plate having a foot strip consisting of a temperature-resistant sintered body.

FIG. 6 shows a particularly preferred embodiment of a positive tubular plate 23, the features of which are advantageous, independently of those of the negative electrode.

As seen in FIG. 6, current conducting strips 34 are provided at both sides of the electrode 23. The actual plate arrangement consisting of tubules 31 extends between these current conducting strips. The tubules 31 are filled with the positive composition 30 and cores 29 consisting of and having lateral projections 33 on their surface, extend axially through the tubules. The cores are enlarged at the top in FIG. 6 and are connected there or cast in one piece with the current conducting strip 34. Foot strip 28 located at the lower end of the plate 23 in FIG. 6, should however consist, as a result of the construction of the invention, of thermally resistant material, preferably of a temperature-resistant sintered body in accordance with FIG. 8.

Whereas the foot strips used nowadays are constructed as indicated in the drawing at 36, in accordance with the invention the cores 29 project during manufacture—as indicated at 37—through corresponding bores in the foot strip 28 and through bores 38 (FIG. 7) of the current conducting strip 34. As seen in FIGS. 6 and 7 the current conducting strip 34 has, in the region of the bores, in the foot strip 28 corresponding to the diameter of the tubules 31, projections which are directed towards the tubules 31 and which penetrate into a fitted seat in the lower region of the tubules 31. The bores 38 extend continuously from the lower surface of the current conducting strip 34 up to the upper end of the associated projections within the tubules 31. If necessary the projections of the current conducting strips 34 can have a step-like reduction in diameter in the region of the lower end of the tubules 31, in accordance with FIG. 7, in such a way that the diameter below the tubules 31 is fractionally larger than it is above it. The end 37 of the core 29 extends through the projections and the current conducting strip 34 in the region of the bore 38.

The current conducting strips 34 carry the connection lugs 13″, 13‴ which are also indicated in FIG. 4.

It is also possible to submerse the arrangement with the cores projecting at 37 into a heated bath in which the current conducting strip 34 with the connection lugs 13‴ is preformed. In place of the plastic strip used today it is possible to use a correspondingly preshaped lead strip with centrally open throughguides. In this case the cores need only be soldered to the lead strip.

Insofar as a foot strip is used of temperature-resistant material, for example a sintered body, the projecting part 37 of the core can simply be welded with the auxiliary form.

Figure 5:
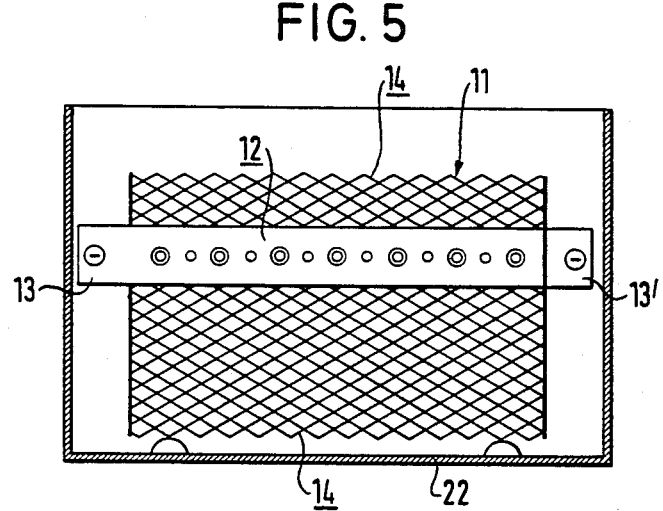
FIG. 5 is a vertical section along the grid plate planes of a further embodiment with vertically arranged negative electrodes in accordance with the invention, with the electrodes having connection lugs at two oppositely disposed sides.

In the embodiment of FIG. 5 the negative electrode plates 11 likewise have connection lugs 13, 13′ formed in one piece with the copper strip 12 at both end faces. In similar manner to the embodiment of FIG. 4 the copper strip 12 is here also horizontally disposed within a housing 22. In contrast to the embodiment of FIG. 4 the electrodes 11 are however vertically disposed. The connection lugs 13, 13′, in just the same way as the non-illustrated connection lugs of the positive plates which are alternatingly provided between the negative electrodes, are again lead via non-illustrated connectors to connection poles of the housing, which are likewise not shown.

The leading of the current out of the negative electrodes 11 is further favored as a result of the arrangement of the connection lugs 13, 13′ at the two ends of the copper strip 12. A plastic terminal strip 10 (FIG. 1) is mounted at the lower end of the grid plate 11, for example by injection moulding it in place.

We claim:

1. A negative electrode for lead accumulators in the form of a rectangular, planar grid plate of expanded copper metal having first and second opposed side edges which is coated with a layer of lead and serves as a carrier for the active mass and for current supply and extraction, wherein the direction of expansion of the expanded metal extends parallel to the first side edge (16) of the rectangular plate at which a connection lug is arranged, and wherein a metallic current conducting strip is provided at said first side edge, extends over the full length thereof and is connected to the connection lug, characterised in that the grid plate (11) consists of two side regions of expanded copper metal (14) and a flat copper strip (12) unitarily arranged therebetween which projects beyond the regions of expanded copper metal (14) at said first side edge to form the connection lug (13); and in that the current conducting strip is formed by the webs (15) of the regions of expanded copper metal (14) located at said first side edge (16) of the grid plate, said webs being appropriately cut off and bent towards one another into mutual contact.

2. An electrode in accordance with claim 1, characterised in that the copper strip (12) is displaced from the center of the grid plate (14) but however relatively close to the center.

3. An electrode in accordance with claim 1, characterised in that the webs (15) are so cut to length at said first side edge (16) between two node points (17) that their remaining length is substantially the same as half the length of the diagonal (18) of the expanded metal mesh (19) extending parallel to said first side edge (16).

4. An electrode in accordance with claim 1, characterised in that the contact of the bent webs (15) is supplemented by a solder connection as a result of subsequent tinning and/or lead plating.

5. An electrode in accordance with claim 1, characterised in that the copper strip (12) has holes (20) distributed over its length, except for the region directly below the connection terminal (13) or said first side edge (16).

6. An electrode in accordance with claim 5, characterised in that each hole (20) is surrounded by a collar (21) which is formed by the copper material pressed out by punching the holes (20) through the strip (12).

7. An electrode in accordance with claim 1, characterized in that the collars (21) are alternately located on opposite sides of the copper strip (12).

8. An electrode in accordance with claim 1, characterized in that the copper strip (12) projects beyond the regions of expanded copper metal (14) at both side ends of the grid plate (11) to form two connection terminals (13, 13').

9. A lead accumulator, characterised in that a plurality of negative grid plates (11) in accordance with claim 8 are horizontally disposed in a housing (22) alternately with separator material and positive plates (23) which likewise have connection terminals (13", 13") at both ends, with a gel-like or fleece bound electrolyte being used.

10. A lead accumulator in accordance with claim 9, characterised in that the positive plates (23) are pocketed in glass fiber mat separator leaves and are constructed as gravity cast grids or as tubular plates.

11. A lead accumulator in accordance with claim 1, characterised in that said tubular positive plates comprise tubules (31) having cores (29), said cores being filled with positive active mass (30) and said cores project substantially beyond a foot strip (28) and are soldered or welded there to a current conducting strip (34) having the connection terminal (13").

12. A lead accumulator in accordance with claim 11, characterised in that said foot strip (28) simultaneously serves as a current conducting strip (34).

13. A lead accumulator, characterised in that a plurality of negative grid plates (11) in accordance with claim 8, are vertically arranged with horizontally extending copper strips (12) in a housing (22) alternatingly with separator material and positive plates (23) which likewise have connection terminals (13", 13") at both ends.

14. An electrode in accordance with claim 1, characterized in that a plastic termination strip (10) is mounted at the foot of the grid plate (11) by injection molding or extrusion.

15. An electrode in accordance with claim 1, characterized in that a current conducting strip is also arranged at the second side edge of the grid plate (11) and is constructed analogously to the current conducting strip at the first side edge.

16. A lead accumulator including a plurality of negative electrodes, said negative electrodes being in the form of rectangular, planar grid plates, each plate being of expanded copper metal having first and second opposed side edges and being coated with a layer of lead and serving as a carrier for active mass and for current supply and extraction, wherein the direction of expansion of the expanded metal extends parallel to the first side edge of the grid plate at which a connection lug is arranged, characterised in that the grid plates are horizontally disposed in a housing alternately with separator material and positive plates and wherein each said grid plate consists of two side regions of expanded copper metal and a flat copper strip unitarily arranged therebetween which projects beyond the regions of expanded copper metal at both side ends of said grid plate to form two connection lugs; said housing having connection terminals at both ends, said separator material being a gel-like or fleece bound electrolyte.

* * * * *